United States Patent [19]
Ishii et al.

[11] Patent Number: 4,966,009
[45] Date of Patent: Oct. 30, 1990

[54] AIR-CONDITIONER PERMITTING COMFORTABLE SLEEPING DURING HEATING OPERATION

[75] Inventors: Katsushi Ishii; Masaya Yamazaki, both of Fuji, Japan

[73] Assignee: Kabushiki Kaisha Toshiba, Kawasaki, Japan

[21] Appl. No.: 377,274

[22] Filed: Jul. 10, 1989

[30] Foreign Application Priority Data

Aug. 9, 1988 [JP] Japan ................................. 63-198577

[51] Int. Cl.$^5$ ............................................. F24F 7/007
[52] U.S. Cl. ........................................ 62/160; 62/161; 98/31.6
[58] Field of Search ................. 98/31.6, 34.6; 165/25, 165/122; 62/160, 231, 179, 161

[56] References Cited

U.S. PATENT DOCUMENTS

| 4,522,255 | 6/1985 | Baker | 98/31.6 X |
| 4,782,999 | 11/1988 | Ishii et al. | 98/40.25 X |
| 4,807,444 | 2/1989 | Aoki et al. | 62/179 |

FOREIGN PATENT DOCUMENTS 61-223448 10/1986 Japan.

*Primary Examiner*—William E. Wayner
*Attorney, Agent, or Firm*—Foley & Lardner, Schwartz, Jeffery, Schwaab, Mack, Blumenthal & Evans

[57] ABSTRACT

There is disclosed an air-conditioner is provided with an indoor unit including a blower fan for a warm or cold wind to the interior of a room, a louver for adjusting the direction of blowing of warm or cold wind from the fan in a range from the ceiling to the floor, a controller for controlling a volume of wind blowing off from the fan, a temperature of a conditioned air, and an angular adjustment of the louver, respectively, and a console panel permitting switching between cooling and heating modes, setting of a temperature, and setting of various modes. A controller provided in this air-conditioner comprises a temperature shifter for setting a raised temperature higher than a set temperature by a predetermined value when a user present in a room and subject to delivery of a conditioned air sets a sleep mode for comfortable sleep during heating, and a louver controller for adjusting an angle of the louver so as to blow warm air having a raised temperature, in the ceiling direction of the room in the sleep mode during heating. With such a configuration, even when a user is going to sleep or is going to wake up, there is no possibility that warm air directly blows him or her. A comfortable air-conditioned environment, particularly when a user is lying close to the floor can be provided.

12 Claims, 7 Drawing Sheets

FIG. 8a
AIR-CONDITIONER — AIR-CONDITIONING INSTRUCTION SIGNAL
FIG. 8b
SET TEMPERATURE — TEMPERATURE RAISE INSTRUCTION SIGNAL, $T_{S+}$, $t+d$
FIG. 8c
LOUVER CONTROL SIGNAL — UPWARD BLOWING SIGNAL, DOWNWARD BLOWING SIGNAL, $t$
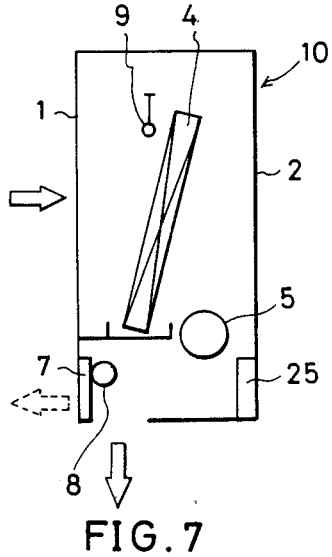
FIG. 7
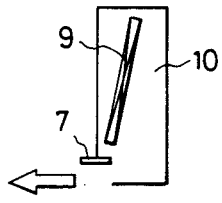
FIG. 9A
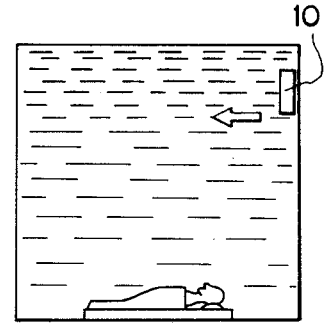
FIG. 9B
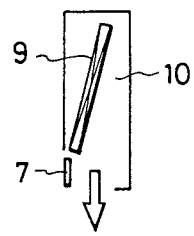
FIG. 10A
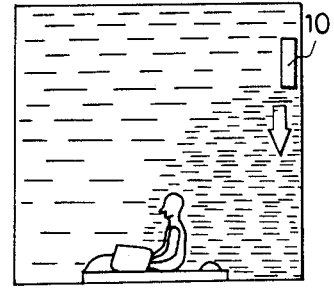
FIG. 10B

AIR-CONDITIONER PERMITTING COMFORTABLE SLEEPING DURING HEATING OPERATION

BACKGROUND OF THE INVENTION

This invention relates to an air-conditioner having excellent characteristics in a sleep mode operation, and more particularly to an air-conditioner permitting, in a sleep mode operation, a person sleeping in a room within which an indoor unit is provided to sleep well and permitting him or her to wake up with a feeling of comfort.

Generally, an air-conditioner having air cooling and heating functions is operated in various operation modes such as a rapid operation mode, and an ordinary operation mode, etc. However, even either in a rapid operation mode or in an ordinary operation mode, when a person is sleeping in a room within which an indoor unit for an air-conditioner is provided, he or she is more sensitive to hot or cold air than when he or she is waking and active. Accordingly, it is required to preset a set temperature to a lower one at the time of heating and to a higher one at the time of cooling. Furthermore, a louver for adjusting the direction of blowing of hot or cold air is required to be set so that hot air blows in a downwards direction at the time of heating and cold air blows in an upwards direction.

For this reason, in conventional air-conditioners, a so-called quiet sleep mode was set in order that a person in a room can sleep well. The sleep mode at the time of cooling is set to preset a set temperature to be slightly high, thus allowing cold air to blow in a direction of the ceiling of a room. Furthermore, the sleep mode at the time of heating is set to gradually lower a set temperature with the lapse of time in order that a temperature of the entire room gradually lowers with time, and to allow hot air to blow in a direction of the floor of the room. The control of the direction of blowing of conditioned air (cold air or hot air) is conducted by adjusting the in the form of a plate provided on the front side of the indoor unit of the air-conditioner so that it is directed upwardly or downwardly.

This indoor unit is comprised of, as shown in FIG. 1A, a front panel 1 having an air blowing opening at the lower side thereof, a rear panel 2 fixed on a wall of the room, a heat exchanger 4 disposed between these panels 1 and 2, an overflow fan 5 rotationally driven by a fan motor 6, and a louver 7 fluctuated and driven by a louver motor 8. In order that conditioned air most suitable for a person in a room to be air-conditioned is provided, a blowoff temperature sensor 9a and an exchanger temperature sensor 9b are secured at the blowing opening 1a and the heat exchanger 4, respectively. The indoor unit 10 is constituted by the components of the panel 1 to the sensor 9.

Particularly in the case of the sleep mode at the time of heating in the sleep operation mode as shown in FIG. 1B, the direction of the louver 7 in the indoor unit 10 is set to the ceiling direction of the room as indicated by a thick arrow so that blowoff air blows in a lower direction. Accordingly, hot air within the room R will flow as indicated by the dotted arrows. Thus, the blowoff air blows, directly and continuously or intermittently during sleeping, around a person sleeping in the room R.

The operation of an air-conditioner provided with an indoor unit shown in FIGS. 1A and 1B is automatically controlled by a control system, e.g., a microcomputer, etc. Such an automatic control is carried out not only in the case of the operation in the sleep mode, but also in the case of a timer operation mode. In this timer operation mode, when time reaches a predetermined time set in advance, the air-conditioner automatically starTS operation irrespective of whether or not a person is present in the room R. Also in this timer operation mode, the direction of the louver 7 is set obliquely downward by an angle $\theta$ relative to the horizontal direction as shown in FIG. 1A, or is set substantially downward as shown in FIG. 1B. Thus, cold air which has not yet warmed is blown directly to a person who is going to wake up.

As just described above, the conventional air-conditioner has the problem that when a person in a room sleeps close to the floor during heating operation, i.e., in the sleep and/or timer operation mode at the time of heating, a person subject to delivery of conditioned air feels uncomfortable by a wind blowing off downward through the louver set downward.

Furthermore, in the timer operation mode at the time of heating, there is a possibility that conditioned air which has not been yet warmed may often blow onto a person close to the floor. This leads to the problem that a person in a room wakes up by the blowing of cold air at an operation start time set by a timer for a time of sleeping in the early morning. Because a person in a room ordinarily desires to wake up in a room sufficiently warmed, it is a matter of course that a scheduled hour of rising is later than the timer operation start time.

A further problem is that when warm air blows around a person present in a room at the time of heating, he or she feels that a relative humidity felt by the skin is lower than an actual one, i.e., air in a room is extraordinarily dry even though an absolute humidity in a room is fixed.

SUMMARY OF THE INVENTION

An object of this invention is to provide an air-conditioner devised so that conditioned blowoff air is not directly in contact with a person in a room at the time of heating particularly when he or she is quietly lying on the floor side, thereby making it possible to eliminate feelings of discomfort in a person to whom conditioned air is delivered.

Another object of this invention is to provide an air-conditioner devised so that air which has not been yet warmed does not directly blow upon a person sleeping for the timer operation mode at the time of heating, thereby eliminating the possibility that a sleeping person is caused to wake up before a scheduled hour of rising.

A further object of this invention is to provide an air-conditioner devised so that warm air does not directly blow onto the skin at the time of heating in the sleep and/or timer operation mode, thus making it possible to prevent a relative humidity sensed by the body from being extraordinarily lowered.

To achieve these objects, an air-conditioner according to this invention functions to effect a control, at the time of heating and when there is a person sleeping close to the floor of a room, such that the direction of warm air blowing from the indoor unit is in correspondence with a direction to form an angle of elevation relative to the horizontal direction.

Furthermore, an air-conditioner according to this invention functions to effect a control, at the time of heating, when there is a person quietly lying close to the side of a room, and when the timer operation mode is preselected, such that the direction of blowing of warm air from the indoor unit, which has not yet sufficiently warmed at the time of starting of operation, is in correspondence to a direction to form an angle of elevation relative to the horizontal direction.

In accordance with the air-conditioner according to this invention, as stated above, since the direction of warm air blowing from the indoor unit is caused to be in correspondence with a direction to form an angle of elevation relative to the horizontal direction, there is no possibility that air is delivered from the indoor unit towards the floor direction in a room in the sleep operation mode and/or in the timer operation mode. As a result, even when there is a person quietly lying close to the floor of a room, feelings of discomfort resulting from the fact that a conditioned warm wind blows directly him or her can be prevented.

Furthermore, since an air-conditioner operable in the timer operation mode such that the blowing direction of a louver, etc. is set to a direction to form an angle of elevation relative to the horizontal direction when the time reaches a set time to start blowing of air from the air blowing opening of the indoor unit towards the interior of a room. Thus, there is no possibility that air which has not been yet warmed blows directly onto a person sleeping lying.

Furthermore, inside a room during heating, a control is conducted such that an absolute humidity is fixed, to therefore prevent extraordinary drying. However, a relative humidity bodily experienced by a sleeping person is lowered by a heating operation of an air-conditioner. Since the air-conditioner according to this invention effecTS a control such that the direction of warm air delivered to a sleeping person is in correspondence with a direction to form an angle of elevation relative to the horizontal direction, resulting in no possibility that a warm wind directly blows onto a sleeping person. Accordingly, lowering of a relative humidity is prevented, thus making it possible to eliminate the possibility that a sleeping person feels extraordinary dryness.

As just described above, an application of the air-conditioner according to this invention eliminates the possibility that warm air or unconditioned cold air directly blows upon a person close to the floor of a room particularly during sleep, and the possibility that he or she feels extraordinary dryness. Thus, an air-conditioner capable of guaranteeing a comfortable and good sleeping and living environment can be provided.

BRIEF DESCRIPTION OF THE DRAWINGS

In the accompanying drawings:

FIG. 7 is a cross sectional view showing the construction of an indoor unit in the air-conditioner of the second embodiment;

FIG. 8 is a signal time chart showing the control operation of respective portions of the air-conditioner of the second embodiment;

FIG. 9A is a cross sectional view showing an indoor unit blowing off warm air in a horizontal direction, and FIG. 9B is a schematic view showing the interior of a room in that state; and FIG. 10A is a cross sectional view showing an indoor unit blowing off warm air in a downward direction, and FIG. 10B is a schematic view showing the interior of a room in that state.

DETAILED DESCRIPTION OF THE PREFERRED EMBODIMENTS

Preferred embodiments of an air-condition according to this invention will be described in detail with reference to the attached drawings.

Figure 1A:
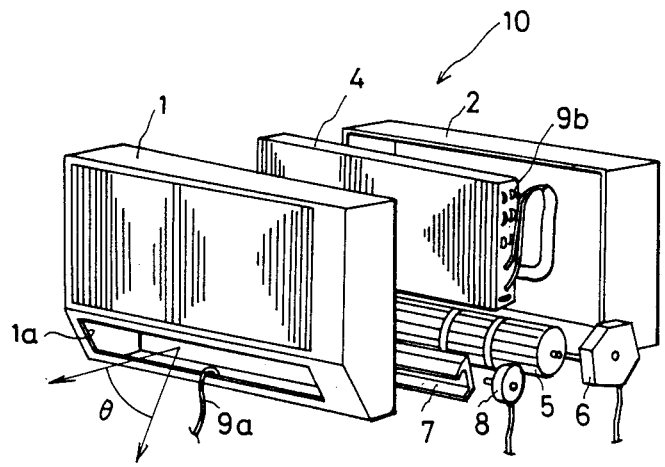
FIG. 1A is an exploded perspective view showing an indoor unit of a typical air-conditioner.
Figure 1B:
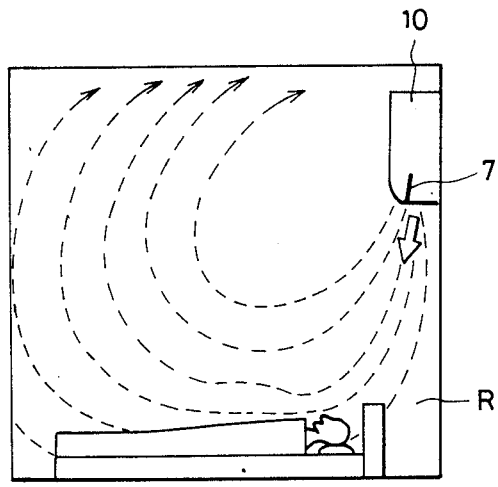
FIG. 1B is a schematic view showing a flow of a warm wind in a room in the sleep operation mode or in the timer operation mode at the time of heating of a conventional air-conditioner.
Figure 2:
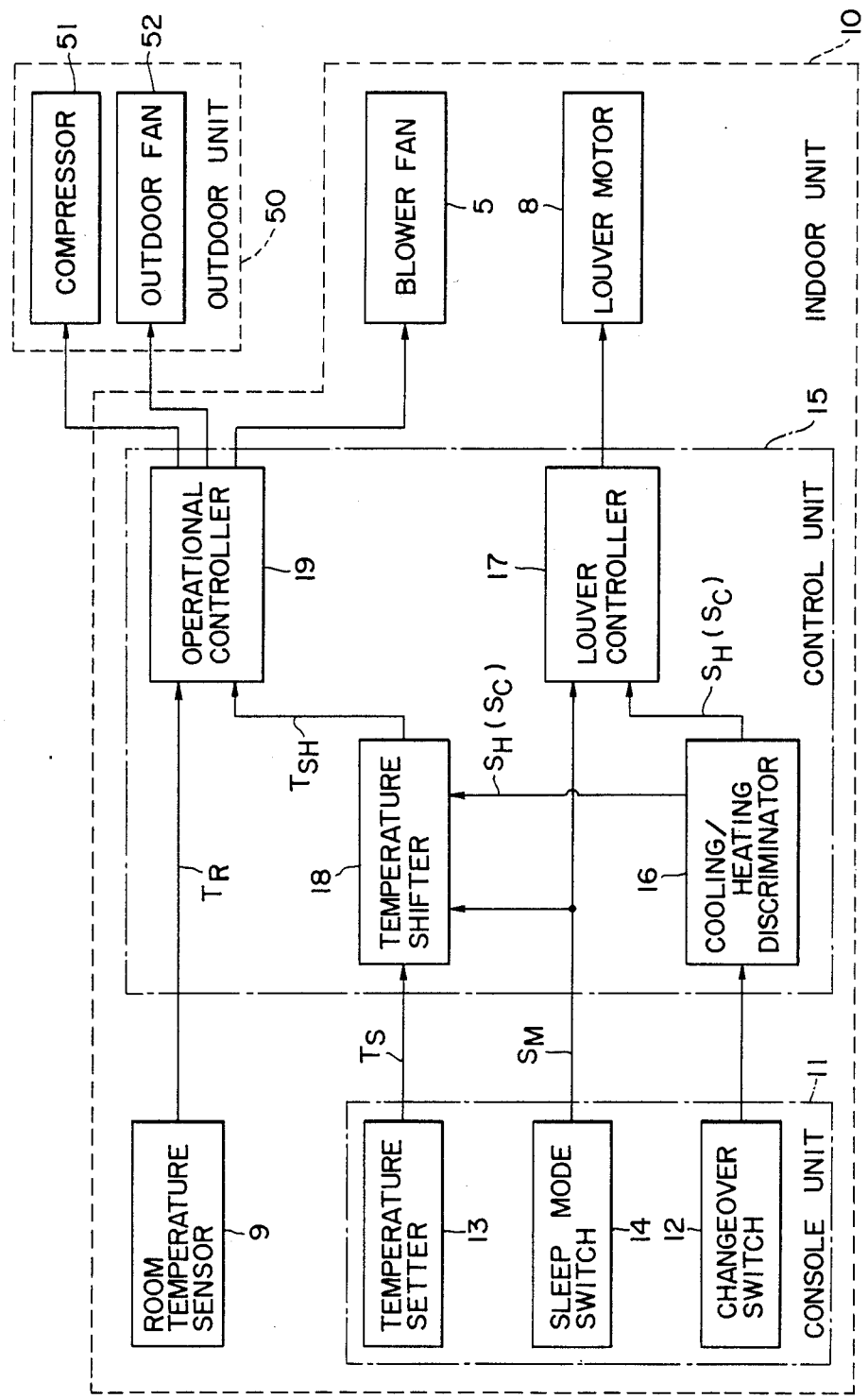
FIG. 2 is a block diagram showing the circuit configuration of a first embodiment of an air-conditioner according to this invention.

Initially, a first embodiment of this invention will be described with reference to FIGS. 2 to 4. The air-conditioner of this first embodiment is constructed so that a sleep mode operation for heating can be carried out as described above. As shown in FIG. 2, this air-conditioner is composed of an indoor unit 10 and an outdoor unit 50. The indoor unit 10 comprises a room temperature sensor 9, a console unit 11 which can be realized with a console plate, etc., and a control unit 15 which can be realized by a microcomputer, etc. The console unit 11 comprises a cooling/heating changeover switch 12 for effecting switching between heating and cooling operation of the air-conditioner, a temperature setter 13 for setting a temperature in a room, and a switch 14 for setting a sleep mode, which serves to make a modification so that a temperature at the time of heating is slightly lower than that in an ordinary operating state and so that a temperature at the time of cooling is slightly larger than that in an ordinary operating state, and to make an adjustment such that a volume of an air when this switch 14 is turned on is smaller than in an ordinary operating state. The control unit 15 comprises a cooling/heating discriminator 16 for discriminating between cooling and heating on the basis of a switching operation of the changeover switch 12, a louver controller 17 for output of a control signal $S_L$ to a louver motor 8 in order to control the direction of the louver 7 on the basis of respective output signals $S_H(S_C)$ and $S_M$ from the discriminator 16 and the sleep mode switch 14, a temperature shifter 18 for shifting a set temperature on the basis of a set output TS from the temperature setter 13 and the signals $S_H$ and $S_M$, and an operational controller 19 for controlling motors of respective drive uniTS on the basis of a room temperature $T_R$ sensed by the room temperature sensor 9 and a raised temperature $T_{SH}$ output from the shifter 18. This operational controller 19 effects a drive control of a blower fan 5 shown in FIG. 1A, and a compressor 51 and an outdoor fan provided in the outdoor unit 50 on the basis of a set room temperature and a selected mode.

The operation of the air-conditioner thus constituted will be briefly described. When the sleep mode switch 14 is turned on, a sleep mode signal $S_M$ is delivered to the louver controller 17. This louver controller 17 rotates the louver motor 8 by a louver drive signal $S_L$ so that the louver 7 is set to a direction to form an angle of elevation relative to the horizontal direction when a discriminating signal from the cooling/heating discriminator 16 indicates a heating signal $S_H$ and the sleep mode signal $S_M$ is input. Under the condition where the interior of the room is warmed by the switch 12, a heating signal $S_H$ is delivered from the discriminator 16, and a quiet mode signal $S_M$ is being output from the switch 14, when a fixed temperature setting signal $T_S$ is set by the temperature setter 13, the temperature shifter 18 raises the temperature of the air so that air having a temperature higher than a set temperature $T_S$ by a predetermined temperature is delivered. It is to be noted that when a discriminating signal from the discriminator 16 indicates a cooling signal $S_C$, the temperature shifter 18 does not raise a set temperature even in the case where the switch 14 is turned on and the operational mode is set to a sleep mode.

A raised temperature $T_{SH}$ output from the temperature shifter 18 and a room temperature $T_R$ sensed by the room temperature 9 are delivered to the operational controller 19. This controller 19 controls the blower fan 5, the compressor 51, and the outdoor fan on the basis of both temperatures $T_{SH}$ and $T_R$ so that they are in a predetermined state.

Figure 3:
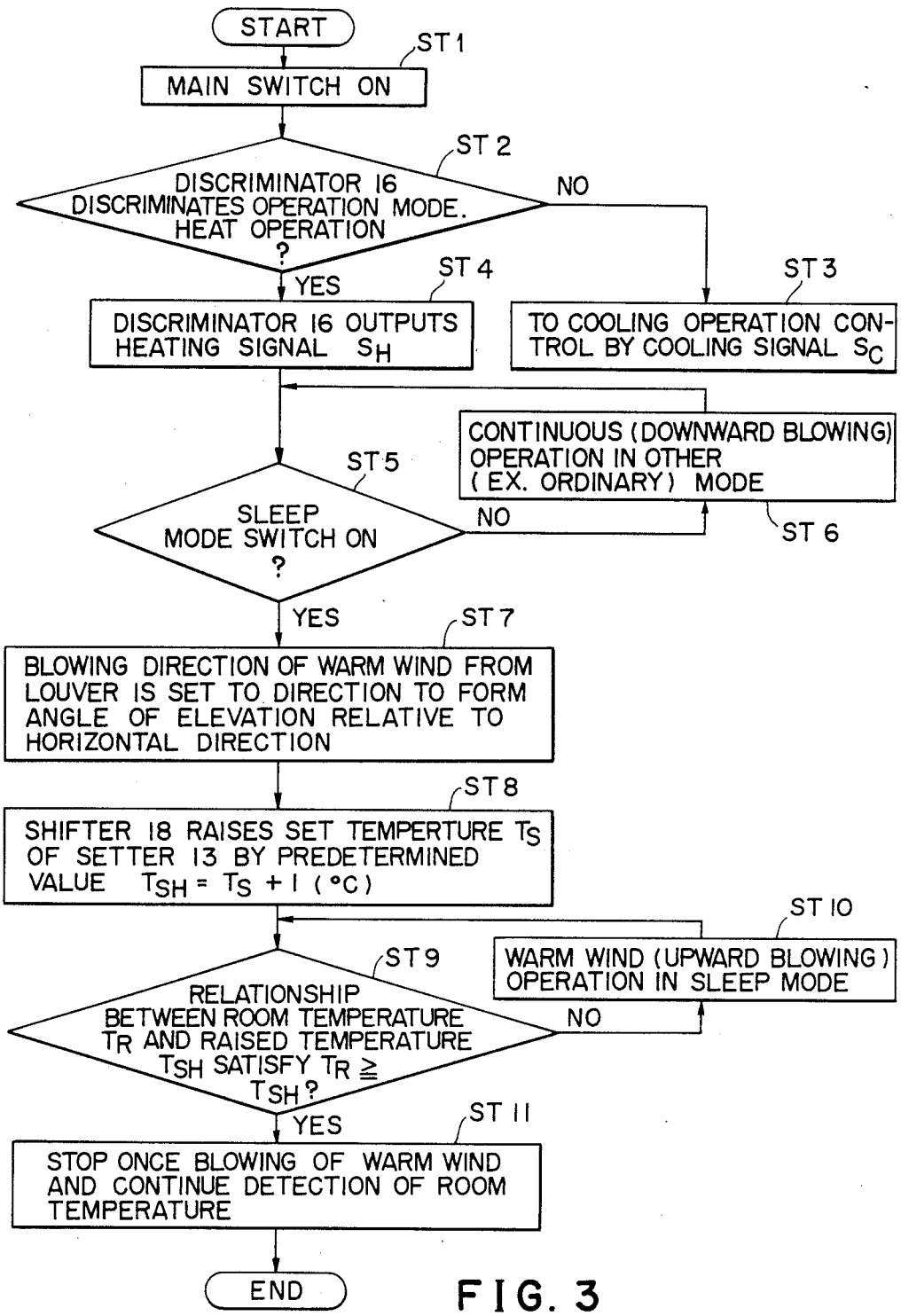
FIG. 3 is a flowchart for explaining the operation of the air-conditioner of the first embodiment.

The overall operation of the air-conditioner is shown by the flowchart of FIG. 3. The outline of the operation will be described in accordance with this flowchart. First, a main switch (not shown) provided on the console unit 11 is turned on. At this time, all switches 12 to 14 of the console panel 11 are turned on or off in many cases. An operating state desirably selected by a user is set (step ST1).

Then, at step ST2, the discriminator 16 discriminates a setting state of the cooling/heating changeover switch 12 in connection with the fundamental operation mode, i.e., discriminates whether the operational mode is in the cooling mode or in the heating mode. On the basis of this discrimination, the discriminator 16 outputs a cooling signal $S_C$ or heating signal $S_H$. Since the control at the time of cooling does not relate to this invention, the description of the detailed configuration and operation for cooling control is omitted. When the switch 12 is set to the cooling mode, the discriminator 16 outputs cooling signal $S_C$. The air-conditioner is thus subjected to cooling operation control (step ST3). In contrast, when the switch 12 is set to the heating mode, the discriminator 16 outputs heating signal $S_H$ (step ST4). The operation advances to a next control step.

The louver controller 17 determines as to whether or not two signals of heating signal $S_H$ and sleep mode signal $S_M$ output in response to on state of the sleep mode switch 14 are input (step ST5). If the switch 14 is not turned on, the air-conditioner continuously conducTS a heating and downward blowing operation in other operation mode, for example, an ordinary mode (step ST6). In contrast, in the case where the switch 14 is turned on and the air-conditioner is operated both in the heating mode and in the sleep mode, the blowing direction of warm wind of the louver 7 is set to a direction to form an angle of elevation relative to a horizontal direction, i.e., in a ceiling direction of a room (step ST7).

On the other hand, heating signal $S_H$ from the discriminator 16 and sleep mode signal $S_M$ from the switch 14 are also delivered to the temperature shifter 18. To this shifter 18, temperature information set by the temperature setter 13 is delivered as a set temperature signal $T_S$. Accordingly, at the time of heating and in the quiet sleep mode, the shifter 18 raises the set temperature $T_S$ by a predetermined value, e.g., 1° C. to output a raised temperature $T_{SH}$ to the operational controller 19 ($T_{SH} = T_S + 1$, step ST8).

Then, the operational controller 19 makes a comparison between the raised temperature $T_{SH}$ and a room temperature $T_R$ sensed by the room temperature sensor 9 (step ST9) to control drive of blower fan 5, etc. on the basis of a compared result. If the raised temperature $T_{SH}$ is higher than the room temperature $T_R$ ($T_R < T_{SH}$), the operation at the time of heating and in the quiet sleep mode is continued until the room temperature $T_R$ exceeds the raised temperature $T_{SH}$. Thus, the air-conditioner continues to blow a warm air in the ceiling direction of a room (step ST10). If the room temperature exceeds the raised temperature $T_{SH}$ ($T_R \geq T_{SH}$), the air-conditioner once stops blowing of a warm wind by stopping the compressor 51 and blower fan 5, and the room temperature sensor 9 continuously senses room temperature $T_R$ to continue delivering temperature information sensed to the operational controller 19 (step ST11). By the implementation up to the step ST11, control operation in the sleep mode at the time of heating is completed. In the case where the room temperature $T_R$ is lowered by the step of the air-conditioner, so the stopping condition $T_R \leq T_{SH}$ of the air-conditioner does not hold, the control step or steps related to re-start of the blower fan 5 and compressor 51 are implemented on the basis that how the control unit 15 is set. For example, step ST9 and ST10 may be repeatedly implemented without presetting the louver 7 for a second time.

Figure 4:
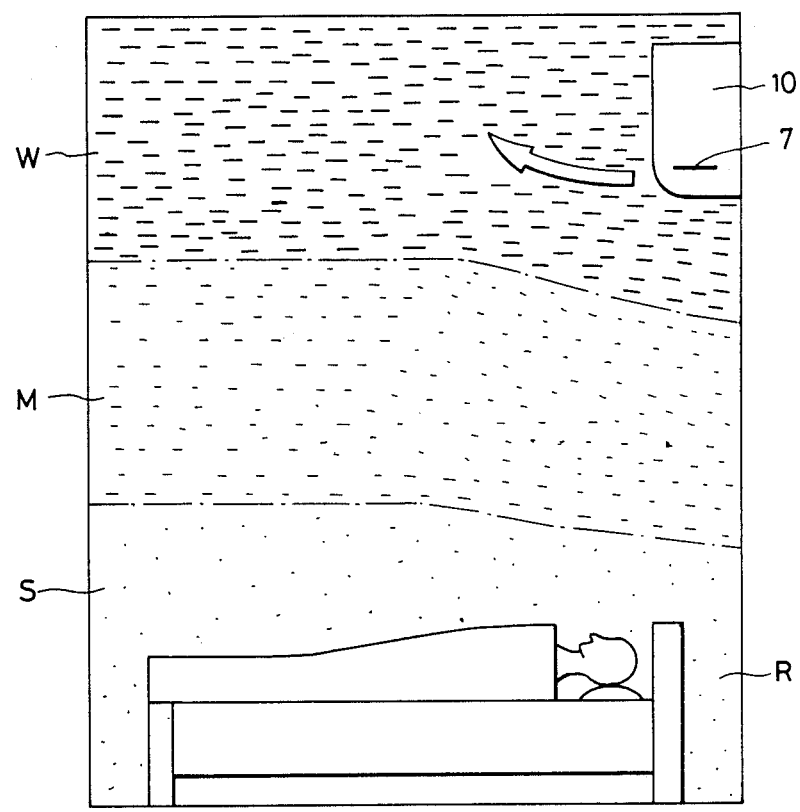
FIG. 4 is a schematic diagram showing a flow of warm air in a room by the air-conditioner of the first embodiment.

The temperature layer of air in a room when the air-conditioner according to the first embodiment is carrying out an operation control in the sleep mode at the time of heating is shown in FIG. 4. By the operation control in the sleep mode at the time of heating which has been explained with reference to the flowchart of FIG. 3, the indoor unit 10 of the air-conditioner will blow warm air having a raised temperature higher than a set temperature by 1° C. in the ceiling direction of the room. Accordingly, a warm high temperature range layer W is formed in the vicinity of the ceiling of the room, an intermedium temperature range layer M is formed therebelow, and a moderate temperature range layer S is formed in the vicinity close to the floor where a person is sleeping. As just described above, warm air is blown toward the portion in the vicinity of the ceiling and a room temperature distribution is provided such that temperature gradually lowers from the ceiling toward the floor. Accordingly, there is no possibility that conditioned air blows directly upon a person sleeping.

Furthermore, since the ceiling side of a room is subjected to temperature control by a raised temperature $T_{SH}$ modified so that it is higher than a set temperature $T_S$ by a predetermined value, there occurs no sudden change in the drive of respective portions of the indoor unit 10 and those portions can be driven by minimum energy.

In the above-described first embodiment, the sleep mode switch 14 is provided for setting the operation mode of the air-conditioner, and a person manually operates this switch 14, thus allowing the indoor unit 10 to blow upward warm air having a raised temperature.

However, this invention is not limited to such an implementation. There may be employed a device utilizing a photo sensor instead of switch 14, such that the sleep mode is automatically set when the interior of a room becomes dark, whereby warm air having a raised temperature is blown towards the ceiling direction. In the case where the air-conditioner is thus constituted, a user can obtain an optimum air-conditioned state of the interior of a room by only turning out the light in the room.

It is to be noted that while control of warm air before a user goes to bed is conducted in the air-conditioner of the first embodiment, this invention is not limited to such an implementation. For example, also in the case where the operation mode is set to a timer operation mode at the time of heating when a user rises from bed, there may be employed a device adapted to blow warm air having a raised temperature towards the ceiling direction using a set time by the timer as a reference.

Figure 5:
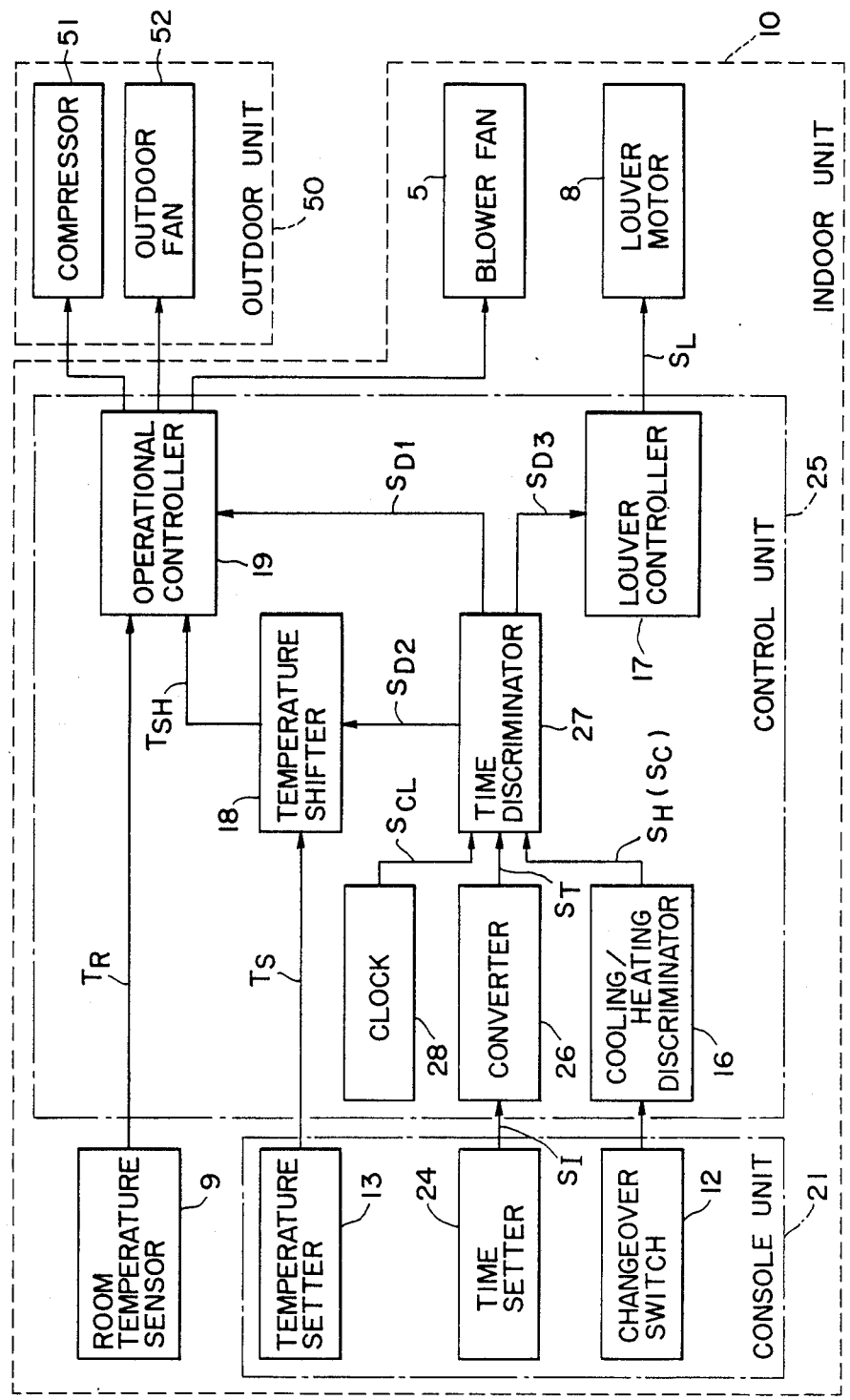
FIG. 5 is a block diagram showing the circuit configuration of a second embodiment of an air-conditioner according to this invention.

An actual configuration for carrying out such a timer operation is shown in FIGS. 5 to 10B. In FIG. 5, the same reference numerals as those in FIG. 2 denote the same components as those in the first embodiment, respectively.

In FIG. 5, a console unit 21 includes a time setter for effecting the timer operation in addition to a cooling-/heating changeover switch 12 and temperature setter 13. Furthermore, a control unit 25 includes, in addition to the components designated by respective reference numerals 16 to 19 of the first embodiment, a signal converter 26 for converting an operating command signal $S_I$ input from the time setter 24 to a time set signal $S_T$, and a time discriminator 27 for monitoring passing of times on the basis of their signals of the signal $S_T$, a time signal $S_{CL}$ delivered from a clock 28, and a heating signal $S_H$. By these novel componenTS 26 to 28, time control means is constituted.

The construction of an indoor unit 10 of the air-conditioner will be first described with reference to FIG. 7. The indoor unit 10 is composed of an indoor heat exchanger 4 accommodated within outer frames 1 and 2, a room temperature sensor 9 for sensing a temperature of air flowing into the indoor heat exchanger 4, a blower fan 5 for allowing air to flow into the indoor heat exchanger 4 and allowing air which has experienced heat exchange to flow out therefrom, a louver 7 rotated by a motor 8 to change the direction of air flowing out, and a controller 25 for controlling the entirety of the indoor unit 10. A compressor, and an outdoor heat exchanger, etc. connecting to the indoor heat exchanger 4 by means of piping to constitute a refrigerating cycle are accommodated within an outdoor unit (not shown). The indoor heat exchanger 4 used serves as a capacitor at the time of heating, and serves as an evaporator at the time of cooling.

The controller 25 shown in FIG. 5 will be now described. The console panel 21 including a temperature setter 13, a time setter 24, and a cooling/heating changeover switch 12, etc. are connected to the controller 25. This controller 25 may be secured on a fixed wall such as the body of the indoor unit 10. A desired room temperature may be set at the temperature setter 13 by a user. The time setter 24 is of a structure capable of setting a time at which the indoor unit 10 is operated or stopped. Namely, this setter functions as a so-called on/off timer. The cooling/heating changeover switch 12 serves to switch the operational mode of the indoor unit 10 so as to operate it either in the cooling mode or in the heating mode. The controller 25 is comprised of a microcomputer and iTS peripheral circuit. When a time is set at the time setter 24, the controller 25 is operative to deliver a working command signal $S_I$ to the converter 26. Responding to this, the converter 26 delivers a time set signal $S_T$ to the time discriminator 27. Thus, the time discriminator 27 monitors the passing of times on the basis of the time set signal $S_T$ from the converter 26 and the time signal $S_{CL}$ output from the clock 28. The cooling/heating discriminator 16 delivers a heating signal $S_H$ to the time discriminator 27 when the time set by the signal $S_T$ is in the time period of from 4 a.m. to 8 a.m. and when the heating mode is set by the cooling/heat changeover switch 12. Responding to this, the time discriminator 27 makes a comparison between the time set signal $S_T$ from the converter 26 and the time signal from the clock 28. When the time signal $S_{CL}$ reaches a time of the time setting signal minus the time t, the time discriminator 27 outputs an air-conditioning command signal $S_{D1}$, a temperature raise command signal $S_{D2}$, and an upward blowing signal $S_{D3}$ when the cooling/heating command signal to the louver controller 17 indicates heating signal $S_H$. It is to be noted that when the cooling/heating command signal indicates the cooling signal $S_C$, no temperature raise command signal $S_{D2}$ is output, and only the air-conditioning command signal $S_{D1}$ and a signal $S_{D3}$ of high level as an upward blowing signal are output. The air-conditioning indication signal $S_{D1}$ is a signal permitting the operation of the air-conditioner. The temperature raise indication signal $S_{D2}$ is delivered to the temperature shifter 18. Thus, the temperature shifter 18 outputs a temperature raise signal indicative of a temperature higher than a temperature set signal $T_S$ based on a temperature set at the temperature setter 13. As shown in FIG. 8(b), the temperature raise signal $T_{SH}$ is a signal for instructing a control of room temperature set to a temperature of $T_S + \beta$ higher than a temperature set signal $T_S$ based on a temperature set at the temperature setter 13, and for maintaining this temperature level for a predetermined time period $(t + \alpha)$. The upward blowing signal is a signal of high level as shown in FIG. 8(c). This signal serves to rotate the louver 2 for allowing air to blow in an upper direction. The air-conditioning command signal $S_{D1}$ and the temperature raise signal $T_{SH}$ are delivered to the operational controller 19. The operational controller 19 sets the number of revolutions of the compressor 51, the number of revolutions of the blower fan 5, and the number of revolutions of the outdoor fan 52 on the basis of temperature setting signal $T_S$ from the temperature setter 13 and temperature raise command signal $T_{SH}$ from the temperature shifter 18, thus to instruct the operations of the compressor 51, the blower fan 5, and the outdoor fan 52. When a predetermined time t elapses after the time discriminator 27 outputs the air-conditioning instruction signal $S_{D1}$, the temperature raise command signal $T_{SH}$, and a high level signal as the upward blowing signal to the louver controller 17, the operational controller 19 outputs a L level signal as a downward blowing signal to the louver controller 17. It is to be noted that an upward blowing signal (a high level signal) continues from the beginning of the operation at the time of cooling operation, which is the same as in the prior art. This downward blowing signal is a signal of low level as shown in FIG. 8(c). When this signal is delivered to the louver controller 17, it serves as a signal for rotating the louver 7 so that air is blown in a lower direction.

Figure 6:
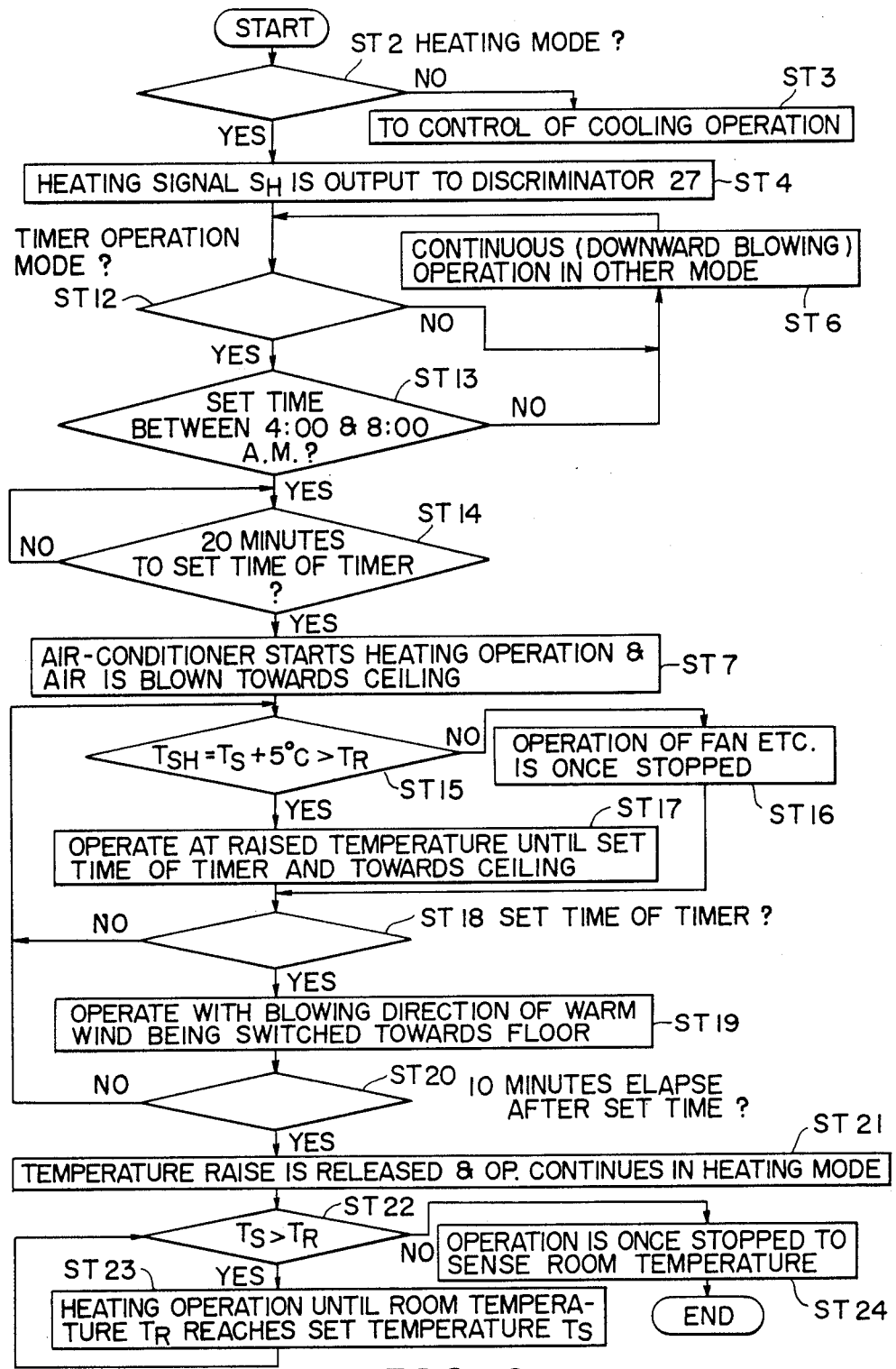
FIG. 6 is a flowchart for explaining the operation of the air-conditioner of the second embodiment.

The operation of the indoor unit 10 in the second embodiment according to this invention will be described in conjunction with the flowchart shown in FIG. 6 on the basis of the controller 25 constructed above.

Since an air-conditioner of this invention is directed to an apparatus for controlling the blowing direction of a warm wind of the indoor unit 10 at the time of heating, a judgement is first made as to whether or not the operation mode is the heating mode at the steps ST2 to ST4 in the same manner as in the first embodiment (see FIG. 3).

At step ST12, a judgment is made as to whether or not an ON timer is set at the time setter 24. When the ON timer is set, an ordinary operation control of the indoor unit 10 is carried out (step ST6). When on timer is set, the program execution shifts to the step ST13. At this time, the converter 26 receives a working command signal $S_I$ from the timer discriminator 24 to deliver a time set signal $S_T$ corresponding to the on timer thus set to the time discriminator 27.

At step ST13, the time discriminator 27 make a judgment as to whether or not the ON timer for rising is set on the basis of time set signal $S_T$. Namely, when this time is between 4 to 8 a.m., it is judged that athe ON timer for rising is set. The program execution shifts to step ST14. In contrast, when time is not between the above-time period, it is judged that the on timer for rising is not set. The program execution shifTS to step ST6. Thus, the indoor unit 10 is operated under the operating condition set at the console panel 21, resulting in an ordinary operating control. It is to be noted that the timer for rising is discriminated by a set time in the second embodiment, but when a switch for rising like a wake-up timer switch is separately provided in advance, such a judgment is not required. In this instance, a discrimination is made as to whether or not this wake-up timer switch is operated. As a result, when that switch is operated, it is sufficient to effect a control (steps succeeding to step ST14).

At step ST14, a judgment is made as to whether or not the time signal $S_{CL}$ is 20 minutes to a time of the time set signal $S_T$. As a result, when it is not the 20 minutes to that time, monitoring of passing of times is continued. On the other hand, when it is 20 minutes to that time, the program execution shifTS to step ST7.

At step ST7, the louver is rotated so that the direction of blowing of air is in a lateral direction as shown in FIG. 9A on the basis of an upward blowoff signal in the same manner as in the first embodiment.

At step ST15, comparison between a temperature higher than the temperature set signal $T_S$ by 5° C., i.e., raised temperature ($T_S+5°$ C.) and the room temperature signal $T_R$ is comapred. If the room temperature signal $T_R$ is not smaller than the raised temperature ($T_S+5°$ C.), it is judged that the room temperature has reached the raised temperature $T_{SH}$ ($T_S+5$). The program execution shifts to step ST16. The operational amplifier 19 once stops the operation of the compressor 51, the blower fan 5, and the outdoor fan 52. On the other hand, if the room temperature signal $T_R$ is smaller than the raised temperature $T_{SH}$ ($T_S+5$), the program execution shifts to step S17.

It is to be noted that the reason why an air having a high temperature is blown in response to the temperature raise command signal $T_{SH}$ is that such a high temperature air is caused to stay in the vicinity of the ceiling to place the ceiling surface in a high temperature state, thus allowing the floor surface which is a sleeping portion to be at a moderate temperature by radiation heat from the ceiling surface with a wind being hardly blown toward the portion in the vicinity of the floor surface.

At step ST17, air-conditioning command signal $S_{D1}$, temperature raise command signal $T_{SH}$ and temperature set signal $T_S$ are delivered to the operational controller 19. Responding to these signals, the operational controller 19 operates the compressor 51, the blower fan 5, and the outdoor fan 52.

The temperature distribution in a room at this time is as shown in FIG. 9B. Namely, an air having a relatively low temperature when the operation of the indoor unit 10 is started is laterally blown out towards the portion in the vicinity of the ceiling, and an air having an elevated temperature is blown out toward the portion in the vicinity of the ceiling in the same manner as stated above and there is formed a layer of air having a temperature lowering according as the distance to the floor surface is reduced.

At step ST18, a judgment is made as to whether or not time reaches a rising time set at the time setter 24. If the time is not the rising time, the program execution returns to step ST15, at which adjustment of the room temperature is made. In contrast, if time is the rising time, the program execution shifts to step ST19.

At step ST19, a downward blowing signal $S_{D3}$ at a third signal is output from the time discriminator 27. This downward blowing signal $S_{D3}$ is delivered to the louver controller 17, thus to rotate the louver 7 so that air is blown out in a lower direction as shown in FIG. 10A. At this time, air having a high temperature in the vicinity of the ceiling of the room is further heated by the heat exchanger 4. The air thus heated is blown out toward the ceiling surface. Accordingly, a user can rise without feeling cold.

At step ST20, a judgment is made as to whether or not 10 minutes has passed after the rising hour. If 10 minutes has not passed, the program execution returns to step ST15, at which adjustment of the room temperature is continued. Namely, air having a high temperature is blown out toward the lower portion of the room for 10 minutes, thus allowing a person to rise in comfort. When 10 minutes have passed, the program execution shifts to step ST21.

At step ST21, output of the temperature raise command signal $T_{SH}$ is stopped.

At step ST22, a judgment is made as to whether or not the room temperature signal $T_R$ is larger than the temperature set signal $T_S$. Namely, the operation returns to an ordinary room temperature control. If the room temperature signal $T_R$ is smaller than the temperature set signal $T_S$, the program execution shifts to step ST23. If the room temperature $T_R$ is not smaller than the temperature set signal $T_S$, the program execution shifts to step ST24.

At step ST23, the compressor 51, the blower fan 5, and the outdoor fan 52 are continuously operated so that a temperature in a room reaches a temperature indicated by the room temperature signal $T_R$. The program execution returns to the step ST22.

At step ST24, when the room temperature reaches a temperature indicated by the room temperature signal $T_R$, each operation of the compressor 51, the blower fan 5, and the outdoor fan 52 is once stopped. Then, the sensor 9 makes a detection of room temperature. An ordinary heating operation based on the temperature control is carried out.

It is to be noted that, although not shown, where an operation input is provided in the middle of this control flow, that control flow is released and the operation shifTS to an operation corresponding to such a new operation input. For example, where a stop input is provided from an operation stop switch, the control flow is released at that time point and the operation of the air-conditioner is stopped.

As just described above, the second embodiment of this embodiment can also prevent an uncomfortable air-conditioning operation such as a downward blowing at the time of heating. Furthermore, there is no possibility that an insufficient conditioned air which has not been yet warmed particularly at the time of rising is blown out, so a comfortable room temperature can be obtained.

It is a matter of course that an approach may be employed also in the second embodiment to form different temperature layers W, M and S which have been described with reference to FIG. 4, thus permitting a room temperature control.

In addition, while it has been described in the first and second embodiments that the temperature shifter is provided, this invention is not limited such an implementation.

As described above in detail, the air-conditioner according to this invention is constructed to allow conditioned air to be blown out in a ceiling direction of a room when a user present in the room is quietly lying at the time of heating operation, and to control warm air having a raised temperature caused to be higher than a set temperature by a predetermined value. Thus, it is possible to prevent warm air or an insufficient conditioned air is blown directly to a user who is going to sleep well or a user who is going to wake up from a sleep state, thus providing a comfortable room temperature.

I claim:

1. An air-conditioner provided with an indoor unit comprising a blower fan operable in a mode selected from cooling and heating modes and adapted to blow warmed air into a room, a louver for adjusting the direction of said warmed air from said blower fan, a controller for controlling an amount of air blowing from said blower fan, a temperature of said room and an angle adjustment of said louver, and a control panel for setting temperature, and various modes;
    wherein said controller includes
    mode selection means for performing changeover operation between an ordinary mode for normal use and a sleep mode for use during a comfortable sleep of a user, and
    a louver controller for adjusting an angle of said louver so as to blow said warmed air in the ceiling direction in said room when operation of said air-conditioner is set to said sleep mode during heating.

2. An air-conditioner as set forth in claim 1, wherein said controller further includes
    a temperature shifter for setting a raised temperature higher than a st temperature set by said control panel by a predetermined value when a user to whom conditioned air is delivered in said room sets a sleep mode in order to sleep during heating.

3. An air-conditioner as set forth in claim 2, wherein said control panel includes a cooling/heating changeover switch for effecting switching between cooling and heating, a temperature setter for a set temperature which provides a reference for setting temperature raise operation of said temperature shifter, and a sleep mode switch as said mode selection means for setting said sleep mode.

4. An air-conditioner as set forth in claim 1, wherein said mode selection means carries out said changeover operation on the basis of sleep mode information automatically set by a brightness sensor such as a photo-sensor provided in said room.

5. An air-conditioner as set forth in claim 2, wherein said controller further comprises a cooling/heating discriminator for discriminating between respective operating states in cooling and heating modes set by said control panel to output a heating signal to said temperature shifter and to said louver controller.

6. An air-conditioner as set forth in claim 2, wherein said controller further comprises an operational controller for performing a computation using a raised temperature set by said temperature shifter and an actual room temperature sensed by a room temperature sensor provided in said room to control drives of a compressor and an outdoor fan of an outdoor unit and said blower fan on the basis of the computed result.

7. An air-conditioner provided with an indoor unit comprising a blower fan operable in a mode selected from cooling and heating modes and adapted to blow warmed air into a room, a louver for adjusting the direction of said warmed air from said blower fan, a controller for controlling the amount of air blowing from said blower fan, a temperature of said room, and an angle adjustment of said louver, and a control panel for setting temperature and various modes;
    wherein said controller includes
    temperature raise means such as a temperature shifter for raising a set temperature,
    a louver controller for controlling a direction of blowing of air from said louver, and
    time control means for outputting signals to said temperature raise means and said louver controller in order to control said temperature raising operation and switching of said blowing direction of said louver at a time earlier by a predetermined time than a starting time set in said sleep mode and when starting timer operation is carried out, at said starting time, and at a time later by a predetermined time than said starting time, respectively.

8. An air-conditioner as set forth in claim 7, wherein said time control means comprises a converter for converting a time setter provided in said control panel and capable of setting an air-conditioning start time to a time signal to output it, a clock for outputting a signal indicative of an actual time, and a time discriminator for outputting control signals to the temperature shifter as said temperature raise means and said louver controller on the basis of three signals of a heating signal output from a cooling/heating discriminator for discriminating between cooling and heating states set by a changeover switch of said console panel, a set time signal output from said converter, and an actual time signal output from said clock, respectively.

9. An air-conditioner as set forth in claim 8, wherein said controller further comprises an operational controller for controlling a compressor and an outdoor fan of an outdoor unit, and said blower fan of said indoor unit on the basis of said control signals output from said time discriminator, a temperature raise signal output from said temperature shifter, and a room temperature signal indicative of an actual temperature sensed by a room temperature provided in said room.

10. An air-conditioner as set forth in claim 8, wherein said operational controller effects a control such that warm air having said raised temperature is blown out in the ceiling direction of said room at a time earlier than said operating start time set by a predetermined time, that the warm air having said raised temperature is blown towards the floor direction of said room.

11. An air-conditioner as set forth in claim 8, wherein said operational controller effects a control such that the temperature raise operation is released after a predetermined time elapses from said start time to carry out an ordinary heating operation.

12. An air-conditioner as set forth in claim 7, wherein said time control means is set a start time for air-conditioning by a timer starting switch.

* * * * *